United States Patent
Busch et al.

(10) Patent No.: US 6,203,161 B1
(45) Date of Patent: Mar. 20, 2001

(54) VISOR WITH PIVOTING VANITY MIRROR ASSEMBLY

(75) Inventors: David B. Busch; Robert C. Fitzpatrick, both of Holland; Rick Alan Anderson, Grand Haven, all of MI (US)

(73) Assignee: Prince Corporation, Holland, MI (US)

( * ) Notice: Subject to any disclaimer, the term of this patent is extended or adjusted under 35 U.S.C. 154(b) by 0 days.

(21) Appl. No.: 09/146,471

(22) Filed: Sep. 3, 1998

Related U.S. Application Data

(63) Continuation-in-part of application No. 08/977,824, filed on Nov. 25, 1997, now Pat. No. 5,975,708.

(51) Int. Cl.[7] .............................. G02B 7/182; F21V 33/00
(52) U.S. Cl. ...................... 359/844; 359/872; 359/876; 362/136; 362/142; 362/144; 362/492; 296/97.1; 296/97.5; 296/97.12
(58) Field of Search ................................. 359/844, 872, 359/876; 362/135, 136, 140, 142, 143, 144, 492; 296/97.1, 97.5, 97.11, 97.12, 97.13

(56) References Cited

U.S. PATENT DOCUMENTS

| | | |
|---|---|---|
| 4,421,355 | * 12/1983 | Marcus . |
| 4,486,819 | 12/1984 | Marcus et al. . |
| 4,541,663 | 9/1985 | Schwanitz et al. . |
| 4,624,499 | * 11/1986 | Flowerday ............................ 362/144 |
| 4,635,994 | 1/1987 | Dietz et al. . |
| 4,652,982 | 3/1987 | Flowerday . |
| 4,734,831 | * 3/1988 | Keyser et al. ....................... 362/144 |
| 4,807,093 | 2/1989 | Cisler . |
| 4,824,159 | 4/1989 | Fluharty et al. . |
| 4,934,802 | * 6/1990 | Fluharty et al. ..................... 359/872 |
| 5,061,004 | * 10/1991 | Happich et al. ..................... 359/872 |
| 5,067,764 | * 11/1991 | Lanser et al. ........................ 362/144 |
| 5,174,644 | * 12/1992 | Hermansson et al. .............. 362/142 |
| 5,182,675 | 1/1993 | Arbisi et al. . |
| 5,538,310 | * 7/1996 | Frankhouse et al. ............. 296/97.11 |
| 5,651,605 | * 7/1997 | Corn ..................................... 362/141 |
| 5,975,708 | * 11/1999 | Fitzpatrick et al. ................ 362/144 |

FOREIGN PATENT DOCUMENTS 1-132437 * 5/1989 (JP) .

* cited by examiner

Primary Examiner—Ricky D. Shafer
(74) Attorney, Agent, or Firm—Foley & Lardner

(57) ABSTRACT

A vanity mirror assembly is pivotally mounted within a recess in a visor body and pivots downwardly and rotates from side to side, thereby pivoting on generally mutually orthogonal axes to provide a high degree of adjustability for use of the vanity mirror without requiring movement of the visor. In a preferred embodiment, illumination means are provided to facilitate use of the vanity mirror in low ambient light conditions.

28 Claims, 6 Drawing Sheets

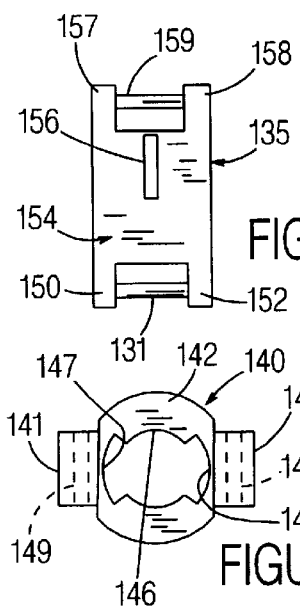
FIGURE 14
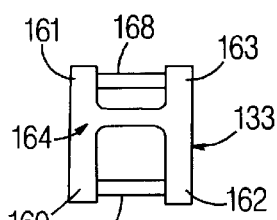
FIGURE 15
FIGURE 16
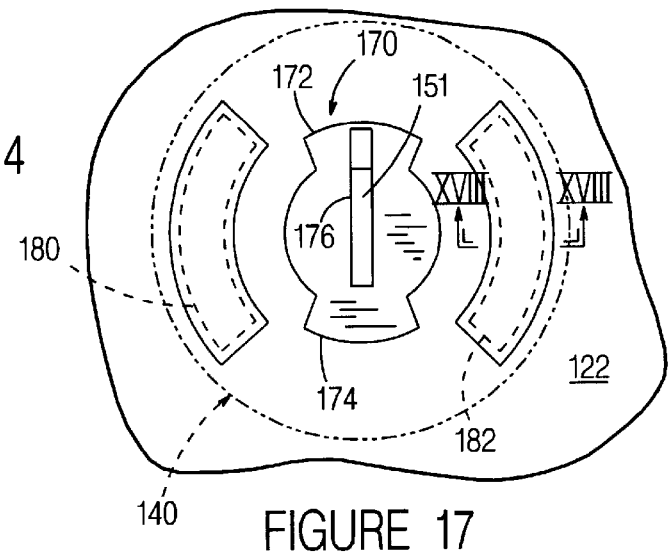
FIGURE 17
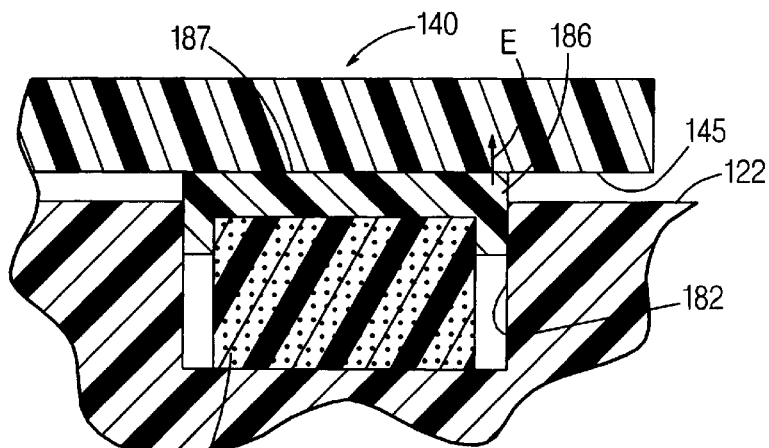
FIGURE 18
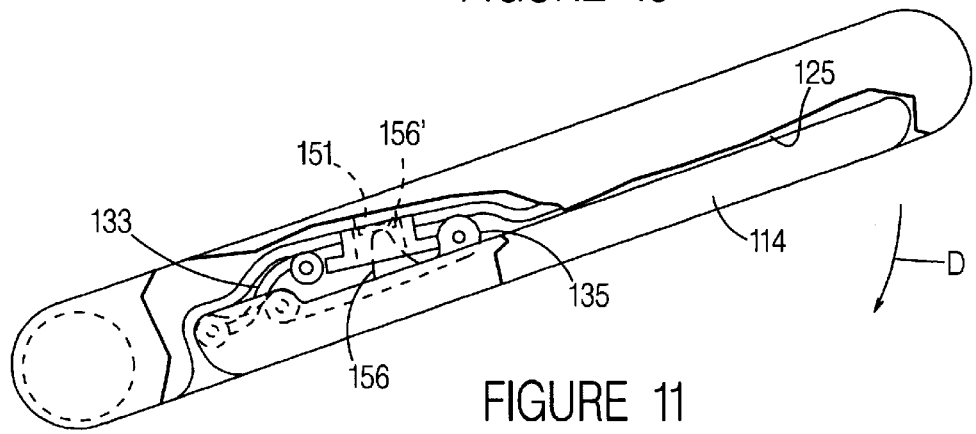
FIGURE 11

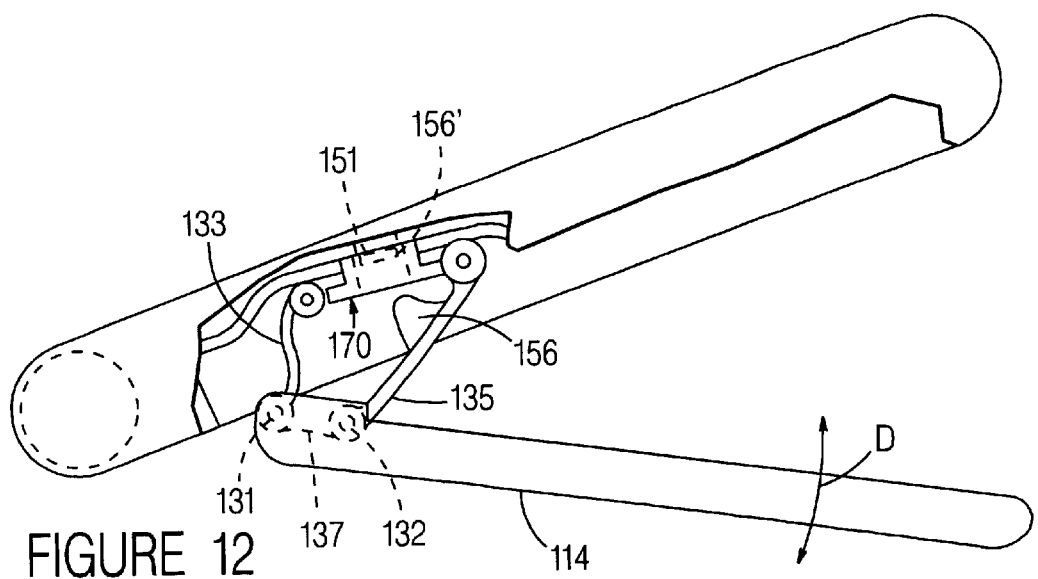
FIGURE 12
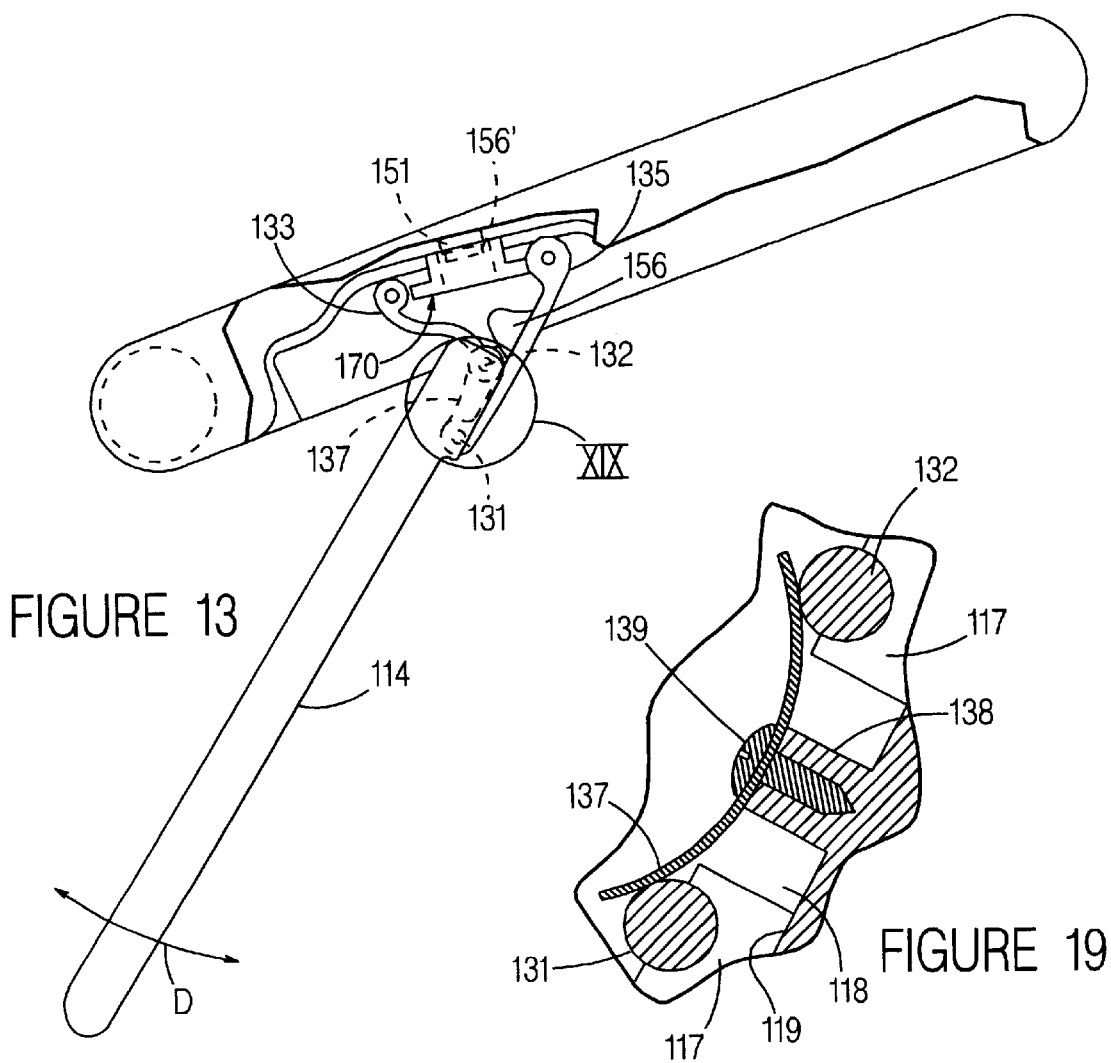
FIGURE 13
FIGURE 19

VISOR WITH PIVOTING VANITY MIRROR ASSEMBLY

CROSS REFERENCE TO RELATED APPLICATION

This application is a continuation-in-part of copending application Ser. No. 08/977,824 filed Nov. 25, 1997, now U.S. Pat. No. 5,975,708, entitled VISOR WITH PIVOTING VANITY MIRROR ASSEMBLY.

BACKGROUND OF THE INVENTION

The present invention relates to vehicle visors and particularly to a visor including a vanity mirror assembly which pivots in orthogonal directions from the body of a visor for use.

Vanity mirror visors are a popular vehicle accessory for personal care and frequently are illuminated for use in low ambient light conditions. Such vanity mirror visors have included vanity mirrors which are movably mounted with respect to the visor bodies themselves for use of the vanity mirror whether the visor is in a raised stored position or a lowered use position. U.S. Pat. No. 4,807,093 shows a reversible vanity mirror assembly which pivots on an axis extending generally parallel to the longitudinal axis of a visor for use in a variety of positions of the visor. U.S. Pat. No. 4,486,819 discloses a visor with a slide-out vanity mirror which is illuminated and can be tilted in a vertical plane for adjustment. In addition to visors having vanity mirrors which extend from the visor bodies or can be adjusted with respect to the visor body, illuminated vanity mirror assemblies for mounting in the vehicle headliner have been proposed and are shown in U.S. Pat. No. 4,824,159, which illustrates a vanity mirror assembly which can be pivoted downwardly and subsequently rotated for use preferably by rear seat passengers. Another example of a pivoted vanity mirror assembly for use in connection with a vehicle is shown in U.S. Pat. No. 5,182,675. It remains desirable, however, to use a visor as a mounting platform for a vanity mirror since vehicles universally include sun blocking visors and they provide a conveniently located position for a vanity mirror for use by either the driver or passenger of the vehicle. Accordingly, there remains a need for a vanity mirror visor which provides a greater degree of adjustability and flexibility for use by the vehicle driver or passenger.

SUMMARY OF THE PRESENT INVENTION

The vanity mirror assembly of the present invention satisfies this existing need by providing a vanity mirror assembly which is pivotally mounted within a recess in the visor body and can pivot downwardly from the visor and subsequently rotate from side to side, thereby pivoting on generally mutually orthogonal axes to provide a high degree of adjustability for use of the vanity mirror without requiring adjustment of the visor itself. It is mounted by a coupling providing a clean appearing show surface and self centers for storage when moved from an extended use position to a stored position. These and other features, objects and advantages of the present invention will become apparent upon reading the following description thereof together with reference to the accompanying drawings.

BRIEF DESCRIPTION OF THE DRAWINGS

FIG. 11 is a left side elevational view, partly broken away, of the vanity mirror shown in FIGS. 9 and 10, shown in a first or stored position;

FIG. 12 is a left side elevational view, partially broken away, showing the vanity mirror in a partially open position;

FIG. 13 is a left side elevational view, partially broken away, showing the vanity mirror in a fully open position;

FIG. 14 is a bottom plan view of one of the links associated with the coupling structure of the vanity mirror assembly shown in FIGS. 9–13;

FIG. 15 is a top plan view of another of the coupling elements for the vanity mirror assembly shown in FIGS. 9–13;

FIG. 16 is a plan view of another link of the coupling structure of the vanity mirror assembly shown in FIGS. 9–13;

FIG. 17 is an enlarged plan view, partly in phantom, of the visor mounted socket for receiving the vanity mirror shown in FIGS. 9–13;

FIG. 18 is a greatly enlarged fragmentary cross-sectional view of the socket taken along section XVIII—XVIII of FIG. 17; and FIG. 19 is an enlarged cross-sectional view of a torque control assembly associated with the vanity mirror and taken in the circled area XIX—XIX of FIG. 13.

DETAILED DESCRIPTION OF THE PREFERRED EMBODIMENT

Figure 1:
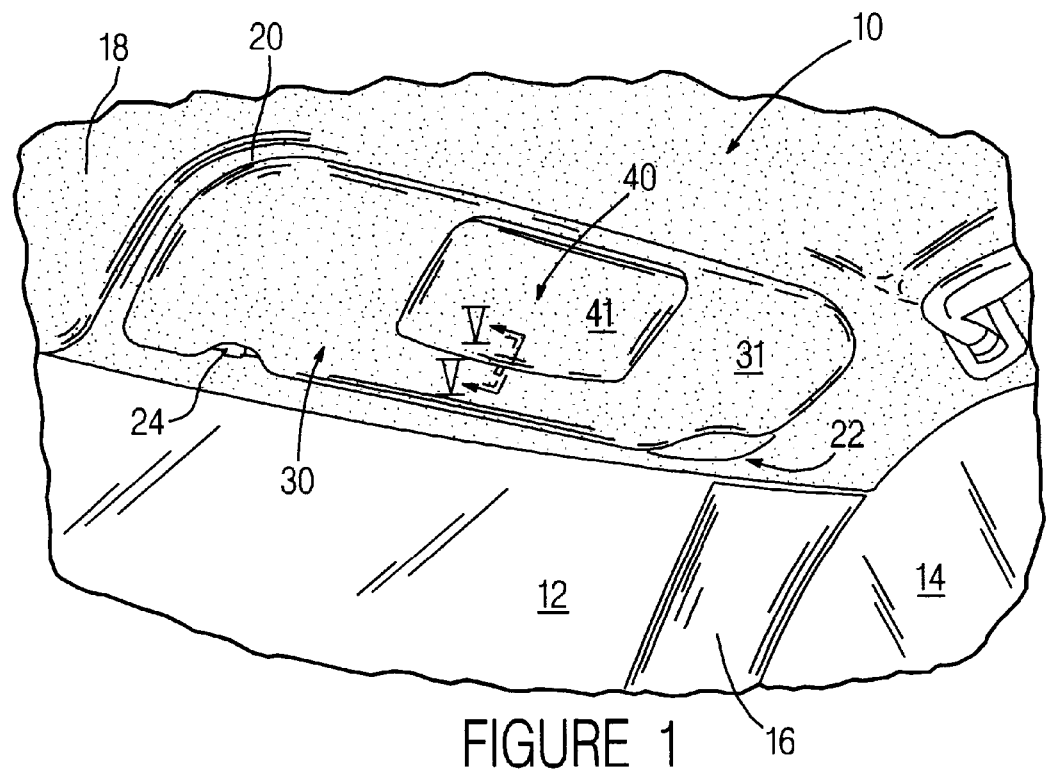
FIG. 1 is a fragmentary perspective view of a vehicle including a visor having a vanity mirror according to the present invention shown in a first position.

Referring initially to FIGS. 1–4, there is shown a vehicle 10, such as an automobile, having a windshield 12 and a side window 14 separated by an A-pillar 16. The roof above the windshield is covered by a headliner 18 including a generally rectangular recessed area 20 for receiving a visor assembly 30 embodying the present invention. Shown in the figures is a passenger side visor assembly 30 which includes a first pivot mounting assembly 22 at one end which can be of conventional design for pivotally mounting the visor between a first stored position, as shown in FIG. 1, to a lowered use position, shown in FIG. 2. The opposite end of the visor assembly 30 includes a snap-release clip 24 for releasably allowing the visor to move from the front windshield position to the side window position in a conventional manner. Mounting assembly 22 includes a hollow L-shaped pivot rod 26 through which electrical conductors from the vehicle's operating power supply extend for providing power for illumination for the illuminated vanity mirror assembly now described.

Figure 3:
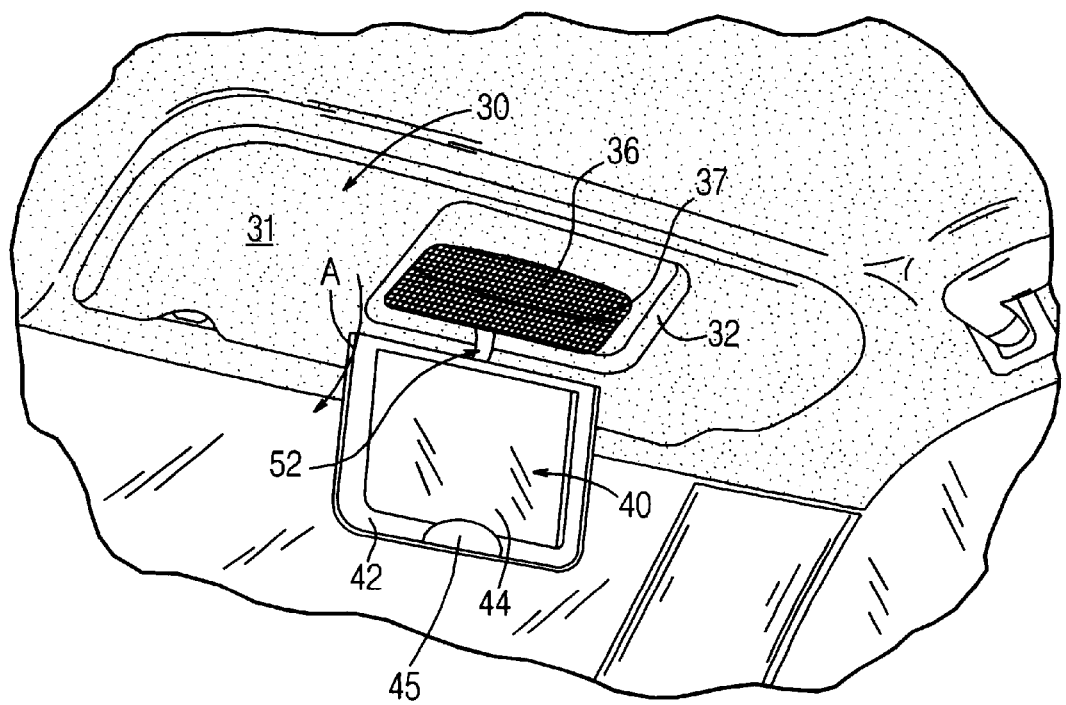
FIG. 3 is a fragmentary perspective view of the structure shown in FIG. 1, showing the vanity mirror assembly lowered to a first use position.
Figure 4:
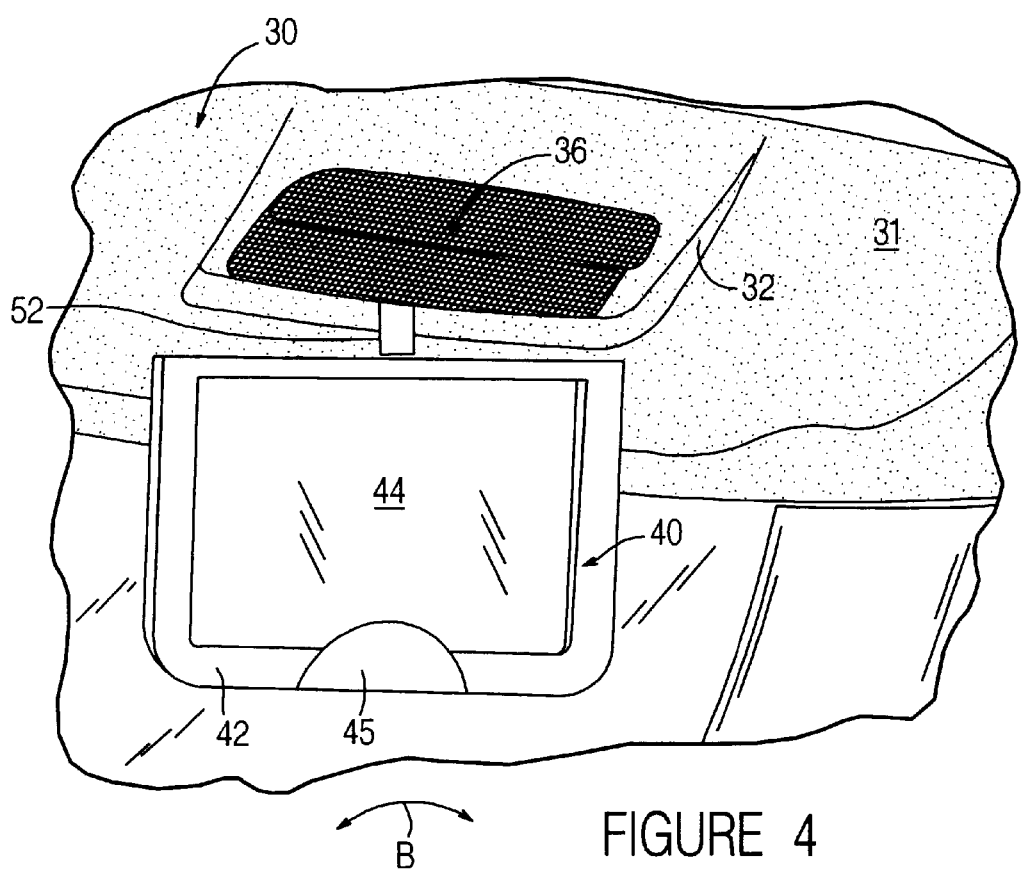
FIG. 4 is an enlarged fragmentary perspective view of the structure shown in FIG. 3, showing the vanity or rotated to another use position.

The visor assembly 30 includes a visor core 34 which can be molded polymeric material such as polypropylene formed in a butterfly configuration, such as disclosed in U.S. Pat. No. 4,763,946, although other visor body constructions can be employed. The visor 30 integrally includes a generally rectangular recess 32 (FIGS. 3 and 4) centrally located on the inward facing surface 31 of the visor 30 when the visor is in a raised position as seen in FIGS. 1, 3 and 4. The recess receives a pivot-down vanity mirror assembly 40 pivotally coupled to the visor body or core 34 by means of a pivot coupling assembly 50, as best seen in FIGS. 5–8, which also extends within the vanity mirror assembly 40.

Figure 2:
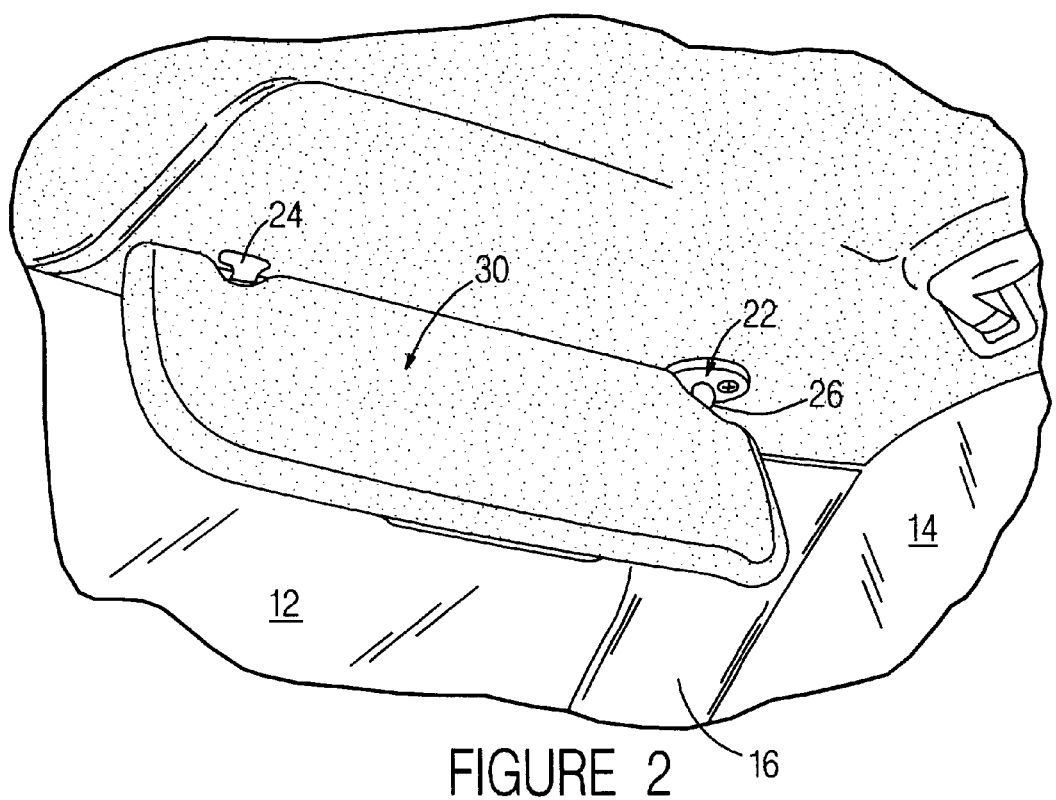
FIG. 2 is a fragmentary perspective view of the structure shown in FIG. 1, shown with the visor in a lowered use position.

Vanity mirror assembly 40 includes a mirror frame 42 into which a mirror 44 is conventionally mounted and includes a recessed area 45 for moving the vanity mirror from a stored position as seen in FIG. 1 to lowered use positions as illustrated in FIGS. 3 and 4. The vanity mirror assembly 40 includes an outward facing surface 41 which is textured to match the surface 31 of visor 30 by suitable upholstering or the like in a conventional manner. The thickness of vanity mirror assembly 40 corresponds to the depth of recess 32 such that when in the stored position as seen in FIGS. 1 and 2 the vanity mirror assembly is substantially flush with the visor surface 31. In one embodiment of the invention, illumination means 36, including a lens 37 behind which are placed one or more lamps electrically actuated by the lowering of vanity mirror assembly 40 to a use position, is provided for use of the vanity mirror 44 under low ambient light conditions. In other embodiments, the vanity mirror assembly 40 itself may include illumination means positioned adjacent the mirror 44 on frame 42. The illumination means and electrical switch for its actuation can be conventional.

The vanity mirror assembly 40 pivots from the stored position shown in FIG. 1 downwardly in a direction indicated by arrow A in FIGS. 3 and 5 and subsequently can be rotated about the now generally vertical axis of collar 52, as indicated by arrow B in FIG. 4, for rotating the visor more toward the center or toward the outside of the vehicle. Thus, the vanity mirror assembly 40 can be lowered and rotated in vertical and horizontal directions for placing the mirror in any desired position with respect to the user's face. The illumination means 36 substantially extends the width of recess 32 in the embodiment shown in FIGS. 1–4 such that sufficient general illumination is provided to the face of the user regardless of the rotated or tilted position of the mirror assembly 40. The coupling of vanity mirror assembly 40 to the visor body is now described in greater detail in connection with FIGS. 5–8.

Figure 5:
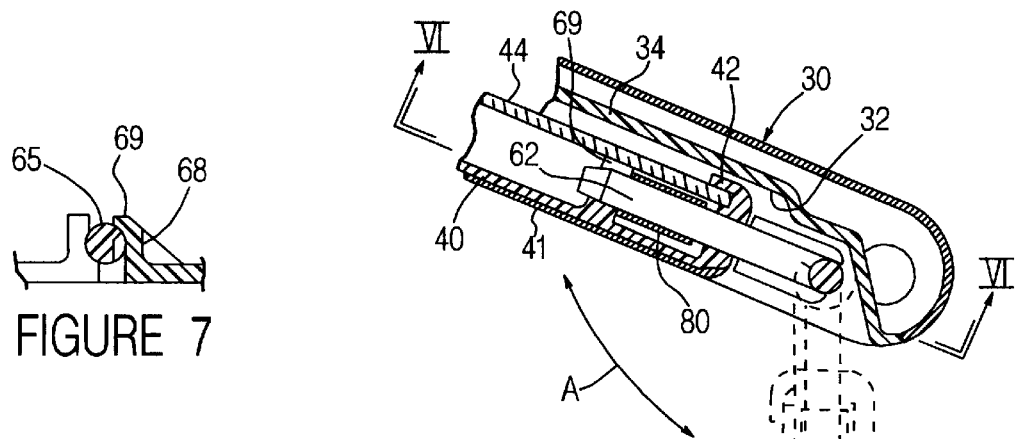
FIG. 5 is an enlarged fragmentary cross-sectional view, partly in phantom form, taken along section line V—V of FIG. 1.
Figure 7:
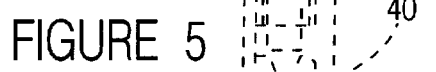
FIG. 7 is a cross-sectional view taken along section lines VII—VII of FIG. 6.
Figure 6:
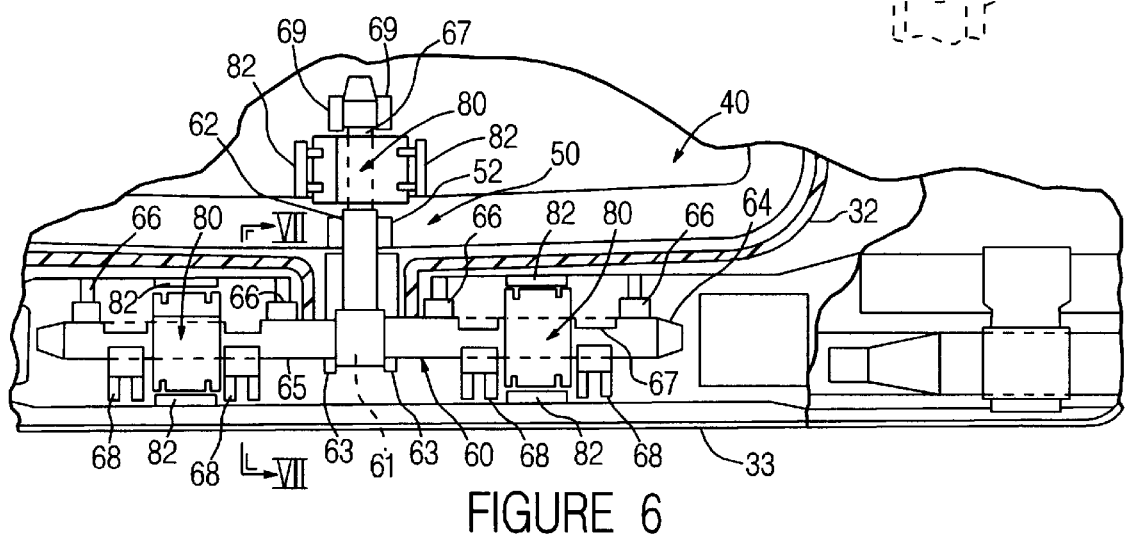
FIG. 6 is an enlarged fragmentary horizontal cross-sectional view of the structure shown in FIG. 5 taken along section lines VI—VI of FIG. 5.
Figure 8:
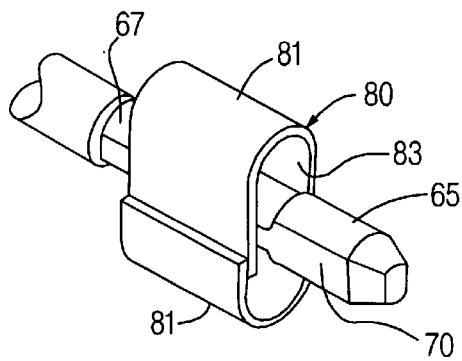
FIG. 8 is a fragmentary perspective view of one of the mounting clips associated with the mounting mechanism shown in FIGS. 5 and 6.

Referring initially to FIGS. 5 and 6, the visor 30 is shown and includes a molded polymeric core 34 which is molded to integrally include the recess 32. The core also houses the pivot control 50 for the vanity mirror assembly 40 in an area of the core near the edge 33 of the visor adjacent the windshield when installed, as seen in FIGS. 1–4 and best seen in FIG. 5. The pivot control 50 includes a pair of mutually orthogonal axes including a generally horizontally extending axle 60 with ends 64 and 65 and a vertically extending axle 62 joined to axle 60 by block 61. Axle 60 is rotatably mounted to the visor core by spaced-apart opposed pairs of spaced mounting bosses 68 which define semicircular sockets for receiving the axle ends 64, 65. Similarly, axle 62 extends into vanity mirror assembly 40 and is rotatably mounted to mounting bosses 69 (FIGS. 5 and 6).

Between each pair of mounting bosses 68, there is positioned a spring clip 80 (FIG. 8) on each of the legs 64, 65 of axle 60. The clip comprises a generally elliptical enclosed loop made of spring steel material surrounding the ends of pivot rod sections 65 and 64, which include flats 70 thereon for holding the vanity mirror assembly 40 in a raised stored position within recess 32, as shown in FIG. 1. The pivot rod also includes a recessed cylindrical section 67 having a semicylindrical sidewall which engages the spring clip 80 for holding the vanity mirror package in a selected lowered use position. Spring clips 80, in turn, are fixedly held within the body of visor core 32 by integrally formed mounting bosses 82 extending on opposite sides of each of the springs for engaging the opposite ends 81 of the spring 80 holding the springs in fixed relationship with respect to the visor core while allowing the pivot rod ends 64 and 65 to rotate within the elliptical opening 83 of the spring through which the rod extends.

The stub axle 62 also extends within a similar spring 80 held between a pair of mounting bosses 82 in the body of the hollow vanity mirror assembly 40, as best seen in FIGS. 5 and 6. Stub axle 62 includes a cylindrical recess 67 but no flats inasmuch as it is desired to allow the visor to rotate about the axle and be held in any desired position without detenting. Axle 60, including aligned ends 64 and 65 and orthogonally extending axle 62 can be integrally formed as a T-shaped member of steel with flats 70 on opposite sides thereof spanning reduced diameter recesses 67 or can extend from the center block 61, which may further be mounted to the core 32 of the visor by means of position blocks 63 further securing the pivot coupling member 50 to the visor for control of the vanity mirror assembly 40. A decorative collar 52 surrounds axle 62 for providing a trim appearance to the coupling of the vanity mirror assembly 40 to the visor 30.

With the construction shown, therefore, a vanity mirror package is provided for a visor and one which can be lowered with the visor in a raised stored position and rotated in a direction orthogonal to the lowering motion to adjust the mirror contained therein to any desired use position. In a preferred embodiment of the invention, illumination means are also provided for use of the vanity mirror in low ambient light conditions. Although the coupling means to provide such mutually orthogonal rotation of the vanity mirror utilizes a pair of axles in the visor and a single axle in the vanity mirror, a single L-shaped pivot axle may also be employed.

In the alternative embodiment shown in FIGS. 9–19, vehicle 10 (FIG. 9) includes a visor assembly 80 coupled to the roof 18 of the vehicle by means of a pivot mounting bracket assembly 22 as in the first embodiment. The visor assembly 80 includes a visor body 82 which can be of a clamshell type construction utilizing integrally molded polypropylene halves defining a core having a recess 88 formed therein for receiving the vanity mirror assembly 100 of the alternative embodiment of the invention. Visor body 82 is covered by a suitable upholstery material -84, such as fabric, leather, vinyl or the like, to conform the appearance of the visor to that of the interior of the vehicle.

Figure 9:
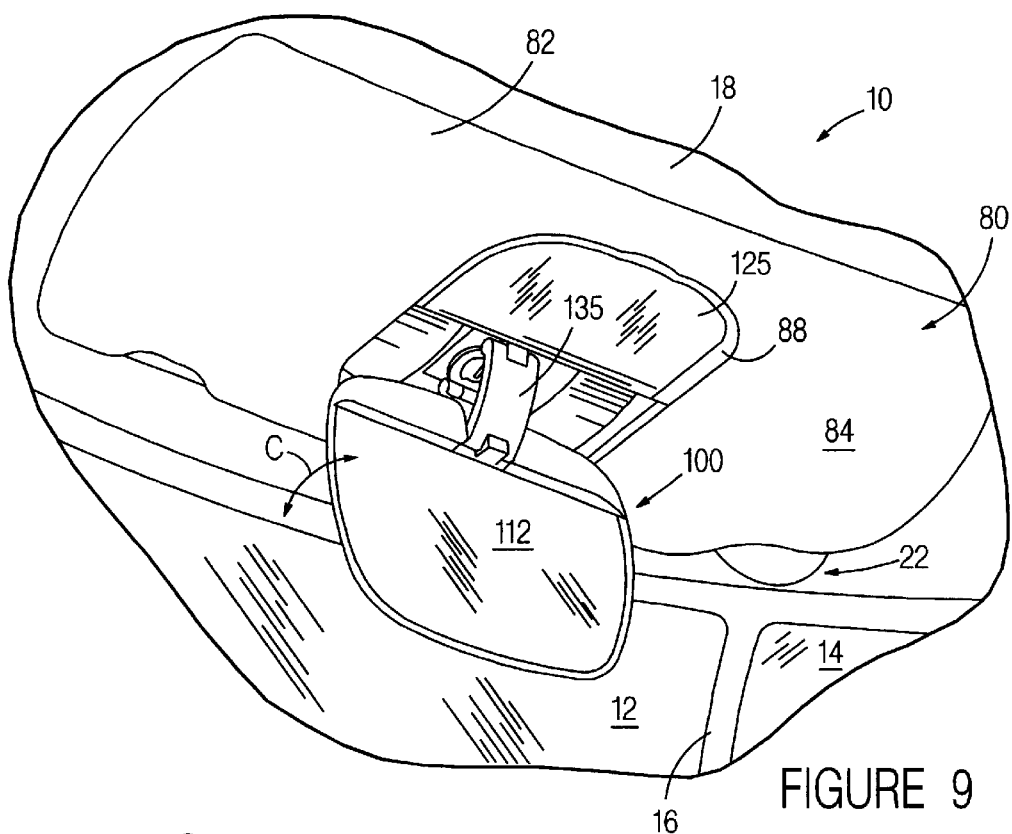
FIG. 9 is a fragmentary perspective view of a vehicle including a visor having an alternative embodiment of the present invention.
Figure 10:
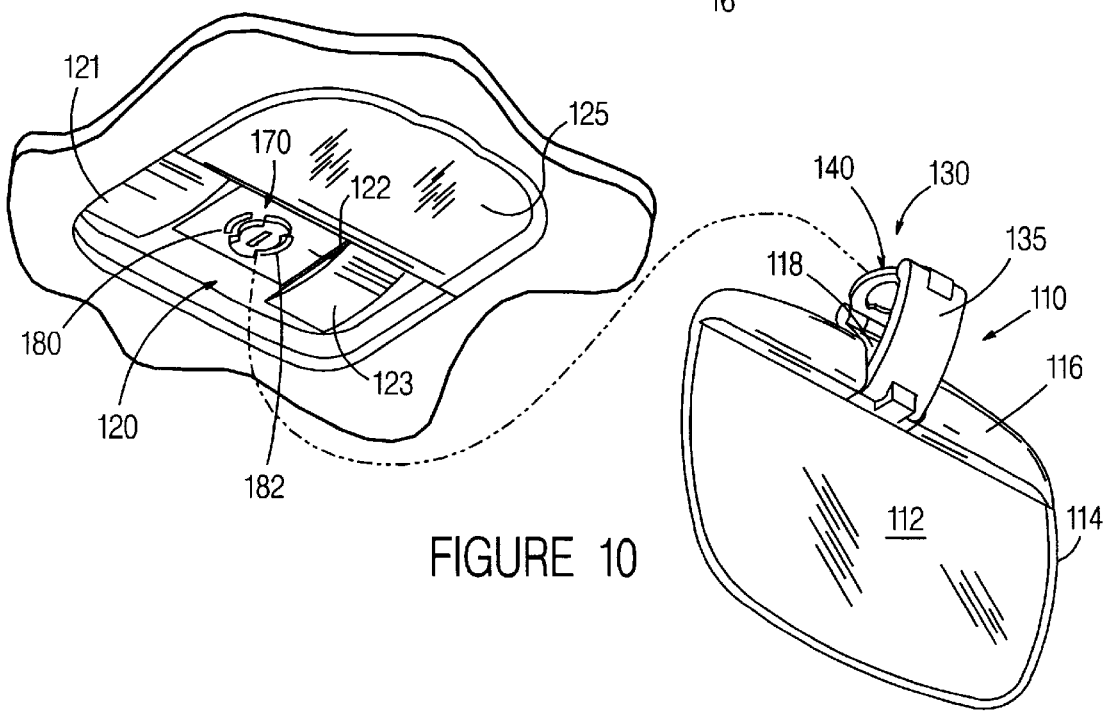
FIG. 10 is a fragmentary perspective view of the vanity mirror visor shown in FIG. 9, shown partially disassembled.

The vanity mirror assembly 100 of the present invention comprises two primary components, a mirror assembly 110 which is coupled within a socket assembly 120 mounted within recess 88 of visor body 82 by means of a coupling assembly 130 comprising a double pivot link arrangement for coupling the mirror assembly 110 to the socket 120. The coupling assembly 130 provides selfcentering of the mirror assembly when it is moved from a fully open position, shown in FIG. 13, to a closed position, as shown in FIG. 11, as described in greater detail below. Further, the vanity mirror 110 can be rotated once in a lowered position, as shown in FIG. 9, about an axis extending generally orthogonal from the plane of socket assembly 120 in the direction indicated by arrow C in FIG. 9 such that not only can the mirror 112 mounted therein, as described below, can be pivoted downwardly to a desired vertical position with respect to the face of the user, it can also be rotated to align the mirror in the desired use position in generally mutually orthogonal axis as in the first embodiment. The coupling assembly 130 includes a link 135 (FIGS. 9 and 14) which presents a clean appearance to the unit when in a lowered use position, as seen in FIG. 9, hiding the remainder of the coupling structure.

The vanity mirror 110 comprises a frame 114 which receives a mirror 112 having a significant area to provide the user with a relatively large mirror for use. In a preferred embodiment, mirror 112 had a height of approximately 3½ inches and a width of approximately 5 inches with rounded corners to conform the mirror to the visor body's appearance when stored. The frame 114 includes an integral upper support rib 116 and can be integrally made of a suitable polymeric material, such as polycarbonate or the like, with the mirror 112 conventionally mounted within the frame. The coupling assembly 130 is mounted within a rectangular socket 118 formed in support rib 116 and pivotally receives a pair of pivot rods 131, 132 (FIGS. 11–13 and 19) coupled to 30 pivot links or arms 133, 135, respectively. Each of the pivot links are shown in detail in FIGS. 14 and 16 and have their ends remote from pivot rods 131, 132 coupled to a mounting disk 140 (FIGS. 10 and 15) as described in greater detail below. The mounting disk 140 attaches to socket 120 in visor body 82 in a bayonet mounting fashion as described in greater detail below.

To provide rotational torque control for the pivoting of the mirror frame 114 downwardly from a stored position, shown in FIG. 11, to a selected use position, such as shown in FIG. 13, a spring clip 137 (FIG. 19) is mounted to a mounting boss 138 extending from the floor 119 of recess 118 in mirror frame 114 and held therein by means of a fastener, such as a self-tapping screw 139. Spring 137 urges against pivot rods 131, 132, providing a frictional torque for the adjacent ends of pivot links 133, 135, to control the force necessary to move mirror frame 114 from a stored position to varied use positions and hold the mirror frame in such use positions. The double pivot links 133, 135 provide the compact pivoting control of the mirror frame in a direction indicated by arrow D in FIGS. 11–13 and permit the rotation of the mirror assembly 110 with respect to socket 120 in a relatively compact space. The pivot rods 131, 132 on the mirror frame 114 side of the pivot links 133, 135 are mounted within semicylindrical cradles 117 formed in the edges of recess 118 of support rib 116 with spring clip 137 holding the pivot rods 131, 132 in the cradles 117 extending from the floor 119 of recess 118.

Each of the pivot links 133, 135 are pivotally coupled at their ends opposite mirror frame 114 to the mounting disk 140 and are each generally H-shaped, as seen in FIGS. 14 and 16, with link 135 including pivot rod 131 integrally extending between lower legs 150 and 152 of the generally Hshaped body 154 of member 135, which includes upper spaced-apart legs 157, 158, having a pivot rod 159 extending therebetween for snap-mounting within a semicircular socket 149 of mounting disk 140. The pivot rod receiving socket 149 is formed in a mounting boss 141 extending from one side of the body 142 of mounting disk 140 having a second mounting boss 143 extending from its opposite side with a similar resilient socket 148 for receiving a pivot pin 168 extending from one end of pivot link 133. Pivot link 135 further includes a centering and switch actuating cam 156 extending from the central body 154 and operationally aligned with the socket 120, as described in greater detail below, for not only actuating a switch for providing illumination for the vanity mirror 112 when in a lowered use position but also for self-centering the vanity mirror assembly 110 as it is moved from an open position, shown in FIGS. 12 and 13, toward a closed position, as shown in FIG. 11, as also described in greater detail below. For such purpose, cam 156 is a generally triangular rounded tab extending generally orthogonally from body 154, as best seen in FIGS. 11–13, and has a rounded tip 156' for actuating a switch 151 in the socket assembly 120 when closed, as seen in FIG. 11.

The second pivot link 133 also is generally H-shaped, having a body 164 with pivot rod 132 extending between downwardly projecting legs 160 and 162 and pivot rod 168 extending between 5 upwardly projecting legs 161 and 163. With pivot rods 131 and 132 captively held to the frame 114 of mirror assembly 110 for pivotal rotation therein, the torque of which is controlled by metal spring clip 137, the remaining pivot rods 159 and 168 of members 135 and 133, respectively, are constrained in their motion with respect to their mounting to sockets 148 and 149 of mounting disk 140 since links 133 and 135 move together. Disk 140 includes a central body 142 having a keyed central opening 146 with a pair of arcuate slots 147 extending from opposite sides of the otherwise circular opening and extending over and lockably engaging, in bayonet fashion, the arcuate flanges of mounting socket 120 as described in greater detail below. As can be appreciated, the mounting disk 140 remains substantially parallel to the floor 122 of mounting socket 120 and is allowed to rotate with respect to such floor, while links 133, 135 promote the pivoting of mirror assembly 110 with respect to the visor body 82. The attachment of the mounting disk 140 to the visor body 82 is now described in connection with FIGS. 10 and 17–18.

The recess 88 formed in visor body 82 includes a pair of lamps positioned behind lenses 121 and 123 (which can be integrally formed) to provide illumination for vanity mirror 112 when in a lowered position. Recess 88 includes a rectangular floor extending between lenses 121 and 123 and a shallower section 125, which receives a substantial section of the mirror 112 facing recess 88 when the mirror is in a stored position, as shown in FIG. 11. Extending from floor 122 is a bayonet-type mounting flange 170 which has a pair of arcuate flanges 172, 174, as best seen in FIG. 17, spaced from floor 122 a distance substantially equal to the thickness of mounting disk 140 such that flanges 172, 174 extend through slots 147 during the mounting of mirror assembly 110 to socket 120 and upon rotation to a use position substantially aligned with the inwardly projecting arcuate sections of mounting disk 140 to lockably hold the mirror assembly to the socket 120 and yet allow rotation of the mirror through an approximately 90° arc, corresponding to the arc circumscribed by the inwardly projecting tangs 146 of mounting disk 140.

To provide rotational torque for the interface between the upper surface of disk 140 and the floor 122 of socket 120, the floor 122 includes a pair of arcuate recesses 180 and 182 (FIGS. 17 and 18) surrounding the flange 170 in position to be aligned under disk 140, as best seen in FIG. 17, when vanity mirror 110 is assembled to visor body 82. Within each of the recesses 180, 182 there is positioned a resilient foam pad 185 (FIG. 18) capped by a polymeric shoe 186 which is urged upwardly in the direction indicated by E in FIG. 18 with its uppermost surface 187 engaging the lower surface 145 of disk 140 to provide, in effect, arcuate frictional pads on opposite sides of mounting flange 170, urging against disk 140 to provide controlled rotation of the vanity mirror package with respect to the visor body. Flange 170 includes a generally rectangular vertical slot 176 aligned with flanges 172, 174 and positioned such that the tip 156' of tab-like cam 156 extends within slot 176 to engage switch 151 positioned behind slot 176 for actuating the illumination means comprising the lamps positioned behind the lenses 121, 123 when the vanity mirror 110 is closed in the position shown in FIG. 11. Although arms 133, 135 and mounting disk 140 are shown as three separate members which snap together as described above, the arms may be integrally insert molded with pivot pins molded in place with respect to mounting disk 140 in a commercial embodiment. As the mirror frame 114 is moved toward the closed position of FIG. 11, the tip 156' of triangular cam 156 will engage rectangular slot 176 and tend to center and align the mirror frame 114 in visor recess 88 as the mirror frame is moved to a stored position.

With the construction of FIGS. 9–19, a relatively compact double pivoting link structure is provided which allows the mirror 112 to be of a significant size with the double link assembly providing a compact pivot mounting arrangement for the vanity mirror assembly 110 while the coupling member 130 together with mounting socket 120 providing controlled rotational torque for adjustment of the mirror in mutually orthogonal axes. As can be seen, link 135 is somewhat longer than link 133 and, in the preferred embodiment, link 135 extended a distance of about 1¼ inch from the center of pivot pins 131, 159 while link 133 extended a distance of approximately ⅞ inch between pivot pins 132 and 168, thereby providing the compact storage of the pivot mechanism as seen in FIG. 11 and allowing a full range of pivot-down adjustment as illustrated by FIGS. 12 and 13 through the use of this dual link pivot mounting arrangement.

It will become apparent to those skilled in the art that various modifications to the preferred embodiments of the invention as described herein can be made without departing from the spirit or scope of the invention as defined by the appended claims.

The invention claimed is:

1. A vehicle visor including a vanity mirror comprising:
a visor body;
a frame including a vanity mirror; and
a pair of spaced-apart pivot links for coupling said frame to said visor body for movement in a first direction from a position in which said vanity mirror extends generally co-planar with said visor body for storage to a position away from said visor body and a second direction orthogonal to said first direction for adjustment of said vanity mirror to a desired use position, said links each having opposite ends;
a pair of spaced apart pivot axes on said visor body;
a pair of spaced apart pivot axes on said frame;
one end of each of said links pivotally connected respectively to one of said pivot axes on said visor body;
an opposite end of each of said links pivotally connected respectively to one of said pivot axes on said frame;
said pivotally connected links cooperating with said pair of pivot axes on each of said visor body and said frame to provide a quadrilateral connection that has a predetermined movement in said first direct ion based on lengths of said links and spacing of said pivot axes on said visor body and on said frame; and
the pivotal connections providing an automatic stop in said first direction at a position away from said visor body.

2. The visor as defined in claim 1 and further including a mounting member and wherein said links for coupling said frame to said visor body each have one end pivotally coupled to said mounting member for rotation of said frame in said first direction, and wherein said mounting member is coupled to said visor body to allow said frame to rotate in said second direction.

3. The visor as defined in claim 2 wherein said visor body includes a mounting flange for captively receiving said mounting member.

4. The visor as defined in claim 1 wherein said visor body includes a recess for receiving said frame.

5. The visor as defined in claim 1 wherein said one of said frame and visor body includes means for illuminating said vanity mirror.

6. A vehicle visor including a vanity mirror comprising:
a visor body;
a frame including a vanity mirror;
a pair of spaced-apart pivot links for coupling said frame to said visor body for movement in a first direction from a position in which said vanity mirror extends generally co-planar with said visor body for storage to a position away from said visor body and a second direction orthogonal to said first direction for adjustment of said vanity mirror to a desired use position; and
a mounting member, wherein said links for coupling said frame to said visor body each have one end pivotally coupled to said mounting member for rotation of said frame in said first direction, and wherein said mounting member is coupled to said visor body to allow said frame to rotate in said second direction, wherein said visor body includes a mounting flange for captively receiving said mounting member, and wherein said mounting member comprises a disk which includes a keyed slot for captively mounting said disk to said mounting flange.

7. The visor as defined in claim 6 wherein said visor body includes a frictional pad extending between said disk and said visor body for controlling the rotation of said frame in said second direction.

8. The visor as defined in claim 7 wherein said pair of pivot links each include pivot rods at opposite ends for pivotally mounting one end of each of said links to said disk and an opposite end to said frame.

9. The visor as defined in claim 8 wherein said frame includes sockets for receiving said pivot rods at said opposite end of said links.

10. The visor as defined in claim 9 and further including a torque control coupling said pivot rods at said opposite end of said links to said sockets of said frame.

11. A vehicle visor including a vanity mirror comprising:
a visor body;
a vanity mirror assembly including a mirror;
coupling means for coupling said vanity mirror assembly to said visor body during rotational movement about a first axis from a storage position in which said vanity mirror assembly extends generally co-planar with said visor body to a position in which said vanity mirror assembly extends generally away from said visor body and for coupling said vanity mirror assembly to said visor body during rotational movement about a second axis orthogonal to said first axis for adjustment of said mirror to a desired use position; and a cam for centering said vanity mirror assembly when moved to the storage position.

12. The visor as defined in claim 11 wherein said coupling means comprises a pair of spaced-apart pivot links for pivotally coupling said vanity mirror assembly to said visor body.

13. The visor as defined in claim 12 and further including a mounting member and wherein said links for coupling said vanity mirror assembly to said visor body each have one end pivotally coupled to said mounting member, and wherein said mounting member is coupled to said visor body.

14. The visor as defined in claim 13 wherein said visor body includes a mounting flange for captively receiving said mounting member.

15. The visor as defined in claim 14 wherein said mounting member comprises a disk which includes a keyed slot for captively mounting said disk to said mounting flange.

16. The visor as defined in claim 15 wherein said visor body includes a frictional pad extending between said disk and said visor body for controlling the rotation of said vanity mirror assembly about said second axis.

17. The visor as defined in claim 16 wherein said pair of pivot links each include pivot rods at opposite ends for pivotally mounting one end of each of said links to said disk and an opposite end to said vanity mirror assembly.

18. The visor as defined in claim 17 wherein said vanity mirror assembly includes sockets for receiving said pivot rods at said opposite end of said links.

19. The visor as defined in claim 18 and further including a torque control coupling said pivot rods at said opposite end of said links to said sockets of said vanity mirror assembly.

20. A vehicle visor including a vanity mirror comprising:

a visor body including a socket for a vanity mirror assembly;

said vanity mirror assembly including a frame with a vanity mirror; and a pair of spaced-apart pivot links for coupling said frame to said visor body for movement in a first direction from a position in which said vanity mirror extends generally co-planar with said visor body for storage to a position away from said visor body and a second direction orthogonal to said first direction for adjustment of said vanity mirror to a desired use position, and wherein one of said links includes a cam which engages said socket for centering said frame when moved to a storage position.

21. The visor as defined in claim 20 and further including illumination means including an electrical switch for providing illumination for said vanity mirror and wherein said cam actuates said switch to selectively actuate said illumination means.

22. The visor as defined in claim 21 and further including a mounting member and wherein said links for coupling said frame to said visor body each have one end pivotally coupled to said mounting member for rotation of said frame in said first direction, and wherein said mounting member is coupled to said visor body to allow said frame to rotate in said second direction.

23. The visor as defined in claim 22 wherein said visor body includes a mounting flange for captively receiving said mounting member.

24. The visor as defined in claim 23 wherein said mounting member comprises a disk which includes a keyed slot for captively mounting said disk to said mounting flange.

25. The visor as defined in claim 24 wherein said visor body includes a frictional pad extending between said disk and said visor body for controlling the rotation of said frame in said second direction.

26. The visor as defined in claim 25 wherein said pair of pivot links each include pivot rods at opposite ends for pivotally mounting one end of each of said links to said disk and an opposite end to said frame.

27. The visor as defined in claim 26 wherein said frame includes sockets for receiving said pivot rods at said opposite end of said links.

28. The visor as defined in claim 27 and further including a torque control coupling said pivot rods at said opposite end of said links to said sockets of said frame.

* * * * *